United States Patent
Backfisch

[11] Patent Number: 6,033,518
[45] Date of Patent: Mar. 7, 2000

[54] METHOD FOR LAMINATING A COMPOSITE DEVICE

[75] Inventor: David L. Backfisch, Monroeville, Pa.

[73] Assignee: PPG Industries Ohio, Inc., Cleveland, Ohio

[21] Appl. No.: 09/046,384

[22] Filed: Mar. 23, 1998

[51] Int. Cl.[7] ...................................................... G02F 1/15
[52] U.S. Cl. ........................................ 156/295; 359/265
[58] Field of Search .............................. 156/295, 306.9, 156/307.7, 292; 359/265

[56] References Cited

U.S. PATENT DOCUMENTS

| | | | |
|---|---|---|---|
| 4,761,061 | 8/1988 | Nishiyama | 359/265 |
| 5,280,381 | 1/1994 | Mason | 359/268 |
| 5,327,281 | 7/1994 | Cogan et al. | 359/270 |
| 5,399,227 | 3/1995 | Abrams | 156/539 |
| 5,433,810 | 7/1995 | Abrams | 156/273.7 |
| 5,471,338 | 11/1995 | Yu et al. | 359/273 |
| 5,618,390 | 4/1997 | Yu et al. | 204/192.26 |

FOREIGN PATENT DOCUMENTS

| | | |
|---|---|---|
| 5-24872 | 2/1993 | Japan . |
| 6-49600 | of 1994 | Japan . |

OTHER PUBLICATIONS

Copending PCT Application Serial No. PCT/US97/07295 entitled, "Laminating Device and Method of Operating Same", filed May 1, 1997, by John E. Smarto.

Copending U.S. Patent Application Serial No. 08/970,031 entitled, "Suspension Lamination Method and Device", filed Nov. 13, 1997, by Charles R. Coleman, et al.

*Primary Examiner*—Daniel Stemmer
*Attorney, Agent, or Firm*—William C. Mitchell

[57] ABSTRACT

A method for preparing laminated composites such as laminated electrochromic devices is disclosed. The method involves placing a plurality of shims between first and second substrates prior to lamination using a laminating adhesive. The shims maintain uniform spacing during lamination. Devices prepared via the instant method are also disclosed.

19 Claims, 2 Drawing Sheets

METHOD FOR LAMINATING A COMPOSITE DEVICE

FIELD OF THE INVENTION

This invention is directed to a novel method for preparing a laminated device comprising first and second substrates and an adhesive interlayer, wherein uniform spacing between the substrates is maintained during lamination via the use of shims. A preferred embodiment relates to the preparation of shimmed electrooptic devices, such as electrochromic lenses. Shimmed devices are also disclosed.

BACKGROUND OF THE ART

The transmittance properties of electrochromic materials change in response to electrically driven changes in oxidation state. Thus, when an applied voltage from an external power supply causes electrons to flow to (reduction) or from (oxidation) an electrochromic material, its transmittance properties change. In order to maintain charge neutrality, a charge balancing flow of ions in the electrochromic device is needed. By enabling the required electron and ion flows to occur, an electrochromic device utilizes reversible oxidation and reduction reactions to achieve optical switching.

Conventional electrochromic cells comprise at least one thin film of a persistent electrochromic material, i.e. a material which in response to the application of an electric field of given polarity, changes from a high-transmittance, non-absorbing state to a low-transmittance, absorbing or reflecting state. Since the degree of optical modulation is directly proportional to the current flow induced by the applied voltage, electrochromic devices demonstrate light transmission tunability between high-transmittance and low-transmittance states. In addition, these devices exhibit long-term retention of a chosen optical state, requiring no power consumption to maintain that optical state. Optical switching occurs when an electric field of reversed polarity is applied.

To facilitate the aforementioned ion and electron flows, an electrochromic film which is both an ionic and electronic conductor is in ion-conductive contact, preferably direct physical contact, with an ion-conducting material layer. The ion-conducting material may be inorganic or organic, solid, liquid or gel, and is preferably an organic polymer. The electrochromic film(s) and ion-conductive material are disposed between two electrodes, forming a laminated cell.

When the electrode adjacent to the electrochromic film is the cathode, application of an electric field causes darkening of the film. Reversing the polarity causes reversal of the electrochromic properties, and the film reverts to its high-transmittance state. Typically, an electrochromic film, such as tungsten oxide is deposited on a substrate coated with an electroconductive film such as tin oxide or indium tin oxide to form one electrode. The counter electrode is typically a similar tin oxide or indium tin oxide coated substrate.

As a voltage is applied across the electrodes, ions are conducted through the ion-conducting material. To ensure reliable operation, the ion-conducting material layer generally must be sealed so as to maintain its water content within a range sufficient to provide required ion conductivity. Also, to reduce optical distortion, the ion-conducting material layer should be of substantially uniform thickness.

The formation of a composite eyeglass lens by bonding front and rear lenses together is disclosed in U.S. Pat. No. 5,399,227. This bonding process in involves placing an adhesive on the concave surface of the front lens, pressing the convex surface of the rear lens against the adhesive on the front lens to spread the adhesive throughout the gap between the two lenses and permitting the adhesive to set to bond the lenses together.

U.S. Pat. No. 5,433,810 also discloses an eyeglass lens lamination method and apparatus which involves pressing lenses together to spread an adhesive between them. The adhesive is cured while the lenses are held together.

An apparatus for aligning and laminating the upper and lower lenses of a composite eyeglass lens is disclosed in Japanese Patent Application No. Hei 5[1993]-24872 and in Japanese Patent Application No. Hei 6[1994]-49600. The apparatus disclosed in these applications includes upper and lower lens retaining members. Each lens is held in its respective retaining member via vacuum and the retaining members are moveable. A bonding agent is applied to the center of the lower lens. The upper lens is then lowered until it touches the bonding agent on the lower lens after which aligning members move laterally to contact the peripheral edges of the upper and lower lenses to axially align them. A composite lens is removed after the bonding agent sets.

PCT/US97/07295 and copending U.S. application Ser. No. 08/970031 filed Nov. 13, 1997, now U.S. Pat. No. 5,916,398, disclose suspension lamination techniques for preparing laminated electrochromic devices U.S. Pat. No. 5,471,338 discloses lamination of two coated plastic substrates using a layer of polymer which bonds with both coated surfaces to form a composite. Homo and copolymers of 2-acrylamido-2-methyl propyl sulfonic acid (AMPSA) form the ion-conducting polymer layer and are cured using actinic radiation, preferably (UV) light.

U.S. Pat. No. 5,327,281 discloses the use of a spacer to separate electrodes and contain a liquid electrolyte injected between the spaced electrodes.

SUMMARY OF THE INVENTION

Other than in the operating examples, or where otherwise indicated, all numbers expressing quantities, ratios, ranges, etc., used herein are understood as modified in all instances by the term "about".

In the manufacture of a laminated electrochromic device, an effective amount of a curable, non-solid adhesive composition, which may comprise a polymerizable monomer or monomers, an initiator, and, optionally, various non-reactive diluents or additives, is typically placed between the mating surfaces of first and second substrates containing electrochromic and electroconductive coatings to form an adhesive interlayer. This can be accomplished by applying a curable, non-solid adhesive composition to one of the mating surfaces and then bringing both mating surfaces together, thereby spreading the curable, non-solid adhesive composition between them. Curing of the adhesive composition completes the lamination process.

The thickness of an adhesive interlayer will vary if uniform spacing between the mating surfaces being bonded is not maintained during lamination. For optical laminates, adhesive interlayers that do not have uniform thicknesses generally cause optical distortion and/or wedge. The novelty of the instant invention involves laminating a first substrate and a second substrate using a non-solid adhesive composition, wherein spacing between the mating surfaces of the substrates is maintained by placing a plurality of shims between the mating surfaces during lamination. By helping to maintain uniform spacing between the substrates, shims reduce wedge and optical distortion.

In the case of a laminated electrochromic lens, the mating surfaces of first and second coated lenses are preferably bonded by forming an ion-conducting polymer (ICP) in situ between the lenses. The outer expanse surfaces of the lenses are the optical surfaces of the composite lens; these optical surfaces may be flat, simple or compound curves (aspheric, bifocal, etc.). The ICP interlayer is typically formed between the mating surfaces of the coated lenses by placing a curable liquid or gel monomer composition on one of the lenses, bringing the lenses together, and then curing. In accordance with the instant invention, uniform spacing between the lenses is maintained during lamination by placing shims between them. This is illustrated in FIG. 1, where ion-conducting polymer layer 7 is disposed between substrates 1 and 2 to form laminated electrochromic device 8. Shims 9 (FIG. 2) insure that spacing between mating surfaces 4 and 5 of substrates 1 and 2, respectively, is substantially uniform, thereby lessening optical distortion.

DETAILED DESCRIPTION OF THE INVENTION

Figure 1:
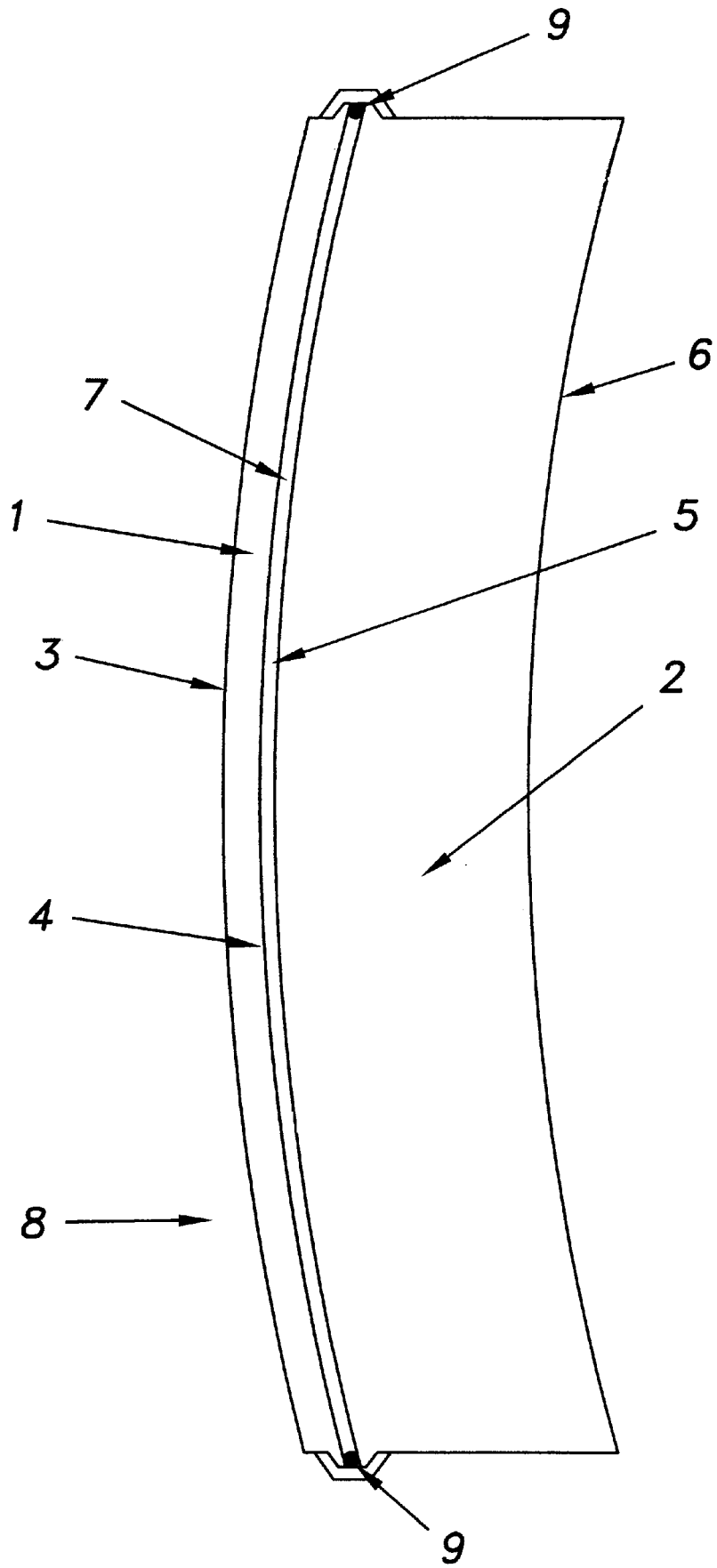
FIG. 1 is a cross-sectional side view of a laminated lens showing an ion-conducting polymer layer of uniform thickness due to the presence of shims.

In its broadest sense, the instant invention is directed to a method for laminating first and second parts having first and second mating surfaces respectively, wherein a curable, non-solid adhesive composition is used to laminate said parts into a composite having an adhesive interlayer between said mating surfaces, which method comprises: a) placing a plurality of shims between said mating surfaces, preferably by placing them on at least one of said mating surfaces; b) placing an effective amount of said curable, non-solid adhesive composition between said mating surfaces, c) bringing said mating surfaces toward each other until said mating surfaces are in contact with said shims, thereby spreading said curable, non-solid adhesive composition between said parts; and d) curing said curable, non-solid adhesive composition. Preferably, said first and second parts are optical, e.g., ophthalmic, lenses. More preferably, said first and second parts are complimentary electrochromic half cells used to prepare an electrochromic eyewear lens bonded by an ion-conducting polymer interlayer.

In another embodiment, the instant invention is directed to a method for preparing a composite or laminated electrooptic device, for example an electrochromic lens, comprising first and second substrates having first and second mating surfaces, respectively, one or both of which contain (s) suitable electroconductive and/or electrooptic or electrochromic coatings, and an adhesive interlayer of substantially uniform thickness which preferably comprises an ion-conducting material, for example an ion-conducting polymer, which method comprises: a) placing a plurality of shims on the mating surface of said first substrate or on the mating surface of said second substrate or on both mating surfaces; b) placing an effective amount of a curable adhesive composition between said mating surfaces, preferably by applying or adding the curable adhesive composition to one of said mating surfaces; c) bringing said first and second mating surfaces together until they are uniformly spaced relative to each other by said shims; and d) curing said adhesive composition, thereby forming a composite having an adhesive interlayer, preferably an ion-conducting adhesive interlayer, of substantially uniform thickness.

As used herein, the term "adhesive composition" encompasses curable or polymerizable precursor adhesives, resins, and/or monomer systems that can, upon exposure to a suitable energy source, react or polymerize to become an adhesive interlayer that bonds first and second substrates to form a composite. Preferably, the adhesive interlayer also serves as an ion-conducting material in various electrooptic devices. Generally, adhesive compositions are in liquid form and are 'puddled' onto the mating surface of the lower of two vertically displaced substrates. Alternatively, these compositions may be classified as gels but in any event are non-solid.

An effective amount of adhesive composition should be used, i.e., that amount necessary to provide the desired adhesive interlayer thickness between the substrates or parts being laminated while effectively bonding the substrates. Preferably, an effective amount is a quantity that does not seep beyond the mating surfaces of the substrates being laminated, but which provides the desired thickness. An adhesive composition generally contains an effective amount of a free radical initiator sensitive to ultraviolet (UW) light, visible light, heat or other energy sources suitable to initiate curing of an adhesive composition. When the device to be laminated is an electrochromic lens, the adhesive composition preferably comprises a resin or monomer which, when cured, forms a transparent ion-conducting polymer that also serves as an adhesive which bonds the substrates of the electrochromic lens together.

While the use of shims is applicable to virtually any lamination method which utilizes a non-solid adhesive composition, a preferred embodiment utilizes shims in conjunction with a suspension lamination method, wherein the adhesive composition is cured as it, through surface tension and/or capillary forces, suspends a lower part from an upper part. This method is especially useful in the preparation of laminated lenses where improved optics are desired and where it is desirable to lessen edge contamination and/or misalignment problems. Suspension lamination is especially suitable when one of the lenses forming a composite is a thin, flexible lens which is easily held from a semi-finished lens by capillary and/or surface tension forces. Suspension lamination methods, including techniques for bringing substrates to be laminated together and for curing adhesive compositions, are described in detail in copending U.S. application Ser. No. 08/970031, now U.S. Pat. No. 5,916, 398, which is incorporated herein by reference in its entirety.

In this preferred suspension lamination embodiment, a plurality of shims are placed one or both of the mating surfaces of the upper and lower lenses, preferably around the periphery of either the top or bottom mating surface. While the lenses are held on their respective lens holders, a curable, non-solid adhesive composition is placed on the mating surface of the lower lens, and an upper lens and the lower lens are brought together by a suitable closure means, thereby spreading the curable, non-solid adhesive composition between the mating surfaces of the lenses. The lens holders are then positioned so that the upper lens, while held on an upper lens holder, suspends the lower lens due to the surface tension and/or capillary action of the curable, non-solid adhesive composition, which is then cured using a suitable energy source. The mating surfaces of the lenses are of substantially equal curvature, and substantially uniform spacing is maintained between these surfaces by the shims.

A suitable curing mechanism involves exposing the adhesive composition, which generally contains one or more monomers and a polymerization initiator, to an appropriate energy source such as an ultraviolet (UV) or visible light source for an effective time, usually for at least about 0.1 minute, thereby curing the adhesive composition and bonding said lenses. An effective cure time is a time which allows a curable, non-solid adhesive composition to become rigid enough that spacing between the substrates being laminated is maintained by the adhesive composition or a time sufficient to provide the desired level of substrate bonding.

In still another embodiment, the instant invention is directed to a method for laminating a first member and a second member having opposed mating surfaces, which method comprises: retaining or positioning said first member in or on a first holding device in a lower position than said second member; retaining or positioning said second member coaxially above said first member in or on a second holding device; positioning a plurality of shims on at least one of said mating surfaces; placing an effective amount of a curable, non-solid adhesive composition between said opposed mating surfaces, preferably on the mating surface of the first (lower) member; bringing the first and second members together, thereby spreading said curable, non-solid adhesive composition between said opposed mating surfaces; optionally suspending said first member from the second member via surface tension and/or capillary forces of said adhesive composition; and curing the curable, non-solid adhesive composition to form a laminated composite.

In the foregoing method, the members are optionally laterally aligned along the center lines of said first and second members prior to curing. As alignment alternatives, any alignment means can be used, or alignment can be accomplished by vibrating the first member and the second member for an effective time using a suitable vibration means. Preferably, however, tooling is precise enough that use of alignment means is unnecessary. By forming a laminated composite with shims in place, optical distortion is reduced.

The instant invention is further directed to composites prepared by the shimmed lamination methods described herein. In particular, the instant invention is directed to composites formed by suspension lamination in the presence of shims between a matched pair of parts, preferably edged lenses.

Thus, in one embodiment of the present invention, an edged semi-finished lens, e.g., a lens greater than 4 millimeters (mm), preferably greater than 6 mm and most preferably greater than 8 mm, thick is laminated to a matching plano lens, e.g., a lens 0.5–2 mm, preferably 0.8 to about 1.2 mm, thick by placing shims between the lenses, laminating the lenses using a non-solid, curable adhesive composition, preferably while suspending the piano lens from the semi-finished lens via the surface tension of a curable, non-solid adhesive composition, and then curing the adhesive composition. In another embodiment, a thin prescription lens with a minimum thickness <2.0 mm is laminated to the mating surface of a matching lens using shims.

The instant invention is also directed to laminated electrochromic devices prepared using and/or containing a plurality of lamination shims. This includes single stack electrochromic devices, wherein electrodes, electrochromic material(s) and an ion-conducting material are coated as a stack on a first substrate which is then laminated to a second substrate, and devices wherein the electrodes are coated on first and second substrates.

As previously noted, this invention applies generally to electrooptic devices. As used herein, electrooptic devices include those devices containing an electrooptic medium or component. Examples include liquid crystal and suspended particle devices. The electrooptic devices of this invention comprise a shimmed adhesive interlayer of substantially uniform thickness.

As used herein and in the claims, the term 'shim' refers to a spacing means or spacer which is compatible with the particular substrates being laminated, the coatings thereon and the curable adhesive composition used to bond the substrates. Shims preferably are prepared using a portion of the curable, non-solid adhesive composition used to laminate a given substrate, or they can be prepared from a different, compatible material. Shim thickness is substantially equivalent to the desired thickness of the adhesive interlayer. For optical applications, transparent shims are preferred, unless they are positioned so as to be unobtrusive. Aside from thickness, the length, width and general shape of shims are not believed to be critical. Irregularly-shaped shims, such as triangular shims, are preferred because they are generally easier to orient on a given substrate than square or rectangular shims. A plurality of shims is required, with the preferred number being that number necessary to provide uniform spacing during lamination without substantial 'rocking' of one substrate relative to the other. Generally, about 3 to about 12 shims are used, depending on the size of composite being prepared.

Shims may be located anywhere on either mating surface as needed to provide uniform spacing. Preferably, they are placed near the peripheral edge of a lower mating surface. For example, for a substantially circular substrate, the shims can be placed at the 12:00, 2:00, 4:00, 6:00, 8:00 and 10:00 positions. Shims are preferably secured to a substrate mating surface via use of an effective amount of a suitable shim adhesive, with appropriate thickness correction. Thus, if a shim adhesive is used, the shim thickness is preferably adjusted to account for the thickness of the shim adhesive layer. A preferred method for affixing a shim to a mating surface involves placing the shim on a drop of the curable, non-solid adhesive composition used to bond the substrates being laminated. Thus, a curable, non-solid adhesive composition can be used for three purposes: 1) to form an adhesive interlayer; 2) to form a shim; and 3) as a shim adhesive.

Various ion-conducting materials can be used to prepare laminated electrooptic devices, including for example, materials comprising hydrogen uranyl phosphate or polyethylene oxide/ $LiClO_4$. Also, ion-conducting polymer electrolytes or inorganic films such as $LiNbO_3$, $LiBo_3$, $LiTaO_3$, $LiF$, $Ta_2O_5$, $Na_2AlF_6$, $Sb_2O_5$ $nH_2O+Sb_2O_3$, $Na_2O$ $11Al_2O_3$, $MgF_2$, $ZrO_2$, $Nb_2O_5$ and $Al_2O_3$ can be used as the ion-conducting material. If an ion-conducting material is not an adhesive, a separate curable, non-solid adhesive must be used.

Preferred ion-conducting materials are ion-conducting polymers which serve the dual functions of being ion-conducting electrolytes and mechanical adhesives. One class of such ion-conducting materials includes ion-containing polymers known as ionomers. These macromolecules contain ionizable groups covalently linked to a polymer chain, typically a hydrocarbon. Polystyrene sulfonic acid and poly (2-acrylamido-2-methyl-1-propanesulfonic acid) are examples of ionomers, both incorporating the protonic acid $SO_3H$ group on the polymer chain. Ionomers are generally formed by polymerizing monomers bearing an ionizable group and also a C=C vinylic group.

In accordance with a preferred embodiment of the present invention, the ion-conducting polymer electrolyte is a proton-conducting polymer selected from the group consisting of homopolymers of 2-acrylamido-2- methylpropanesulfonic acid (AMPSA) and copolymers of AMPSA with various monomers. Such polymers are generally prepared from liquid reaction mixtures of monomers which are cast and cured in place between the substrates. A preferred proton-conducting polymer electrolyte in accordance with the present invention is a copolymer of AMPSA and N,N-dimethylacrylamide (DMA), preferably cast and cured in place. More preferred copolymers of AMPSA and DMA are prepared from AMPSA and DMA monomers in a molar ratio range of about 1:3 to 1:2. The thickness of the polymer electrolyte is not believed to be critical but in general is in the range of 0.001 to 0.025 inch (0.0254 to 0.625 millimeter).

To prepare shims, a curable, non-solid adhesive composition can be cast into a thin polymer sheet of desired thickness using a suitable mold, such as Teflon® polytetrafluoroethylene mold; the adhesive composition is then cured to form a polymer sheet. Shims are then cut from this sheet. For example, shims prepared from AMPSA and DMA (the preferred polymers described above) can be conveniently prepared and used when AMPSA/DMA ion-conducting polymers are used as the interlayer between half cells of electrochromic devices. When polymer shims are of the same material as the ICP used in a given device, the result is a polymer interlayer that is substantially homogenous.

The first and second substrates of the instant laminated devices are generally glass or organic polymeric substrates conventionally used to prepare electrochromic articles or devices. Preferably, polymeric organic substrates are used. Substrates to which the shimmed lamination method of the present invention applies are preferably prepared from transparent materials suitable for producing optical lenses, preferably ophthalmic lenses, such as lenses prepared from synthetic organic optical resins. Alternatively, the substrate can be a non-transparent solid material.

A suitable transparent lens may have a conventional refractive index (1.48–1.5), a relatively high refractive index (1.60–1.75), or a mid-range refractive index (1.51–1.59), depending on the end use. In general terms, the transparent lens may have a refractive index within the range of between 1.48 and 1.75, e.g., from about 1.50 to about 1.8.

Synthetic polymer substrates that may be used as a lens material include, but are not limited to: thermoplastic polycarbonates, such as the carbonate-linked resin derived from bisphenol A and phosgene, which is sold under the trademark LEXAN; polyesters, such as the material sold under the trademark, MYLAR; poly(methylmethacrylates), such as the material sold under the trademark, PLEXIGLAS; and polymerizates of a polyol(allyl carbonate) monomer, especially diethylene glycol bis(allyl carbonate), which is sold under the trademark CR-39®. Copolymers of the aforedescribed monomers/resins may also be used as a lens material. These and other transparent and non-transparent polymeric substrates known in the art for use for various optical and non-optical applications may be used.

Conventionally, in the preparation of laminated electrochromic lenses, a cathodically coloring electrochromic material, usually tungsten oxide or compounds thereof, is deposited at a thickness of about 800 to 5,000 Angstroms on a transparent substrate that has been previously coated with an electroconductive metal oxide film, such as tin oxide or indium tin oxide (ITO), which electroconductive film serves as one electrode. Preferably, the electroconductive film comprises indium and tin at a weight ratio of about 90:10. The film thickness is preferably in the range of about 800–4,000 Angstroms for acceptable conductivity. The electroconductive and electrochromic films may be deposited by a variety of methods, so long as the substrate is not deleteriously affected. The adhesion of an electroconductive metal oxide film directly to a plastic substrate may be improved by application of a primer to said substrate prior to coating.

In such lenses, the counter electrode is preferably prepared by depositing a similar metal oxide coating on a second transparent substrate, with or without a complimentary electrochromic film. A suitable complimentary electrochromic film is a nitrogen-containing iridium oxide film as disclosed in U.S. Pat. No. 5,618,390 to Yu, Backfisch, et al., which is incorporated herein by reference in its entirety. After shim placement, the ion-conducting material precursor is disposed between the substrates so coated; in the case of ion-conductive polymers, a composition comprising one or more polymerizable monomers and a suitable initiator is generally cured or polymerized in situ by energy which passes through a transparent substrate coated with an electroconductive film and/or an electrochromic film.

After lamination, the laminated electrochromic device, preferably an electrochromic eyewear lens, comprises an ion-conducting material, preferably an ion-conductive polymer, of substantially uniform thickness sandwiched between two coated substrates containing appropriate electroconductive and electrochromic films. These devices are then generally edge sealed. Absent an edge seal, the ion-conducting material is exposed to the environment along the circumferential edge region of the laminate.

The instant invention is now described via reference to the Figures. FIG. 1, which is not drawn to scale, shows a cross-section of shimmed, laminated lens 8 containing ion-conductive polymer (ICP) layer 7. In this figure, coated substrate 1 is the front lens of laminated electrochromic lens 8. This front lens 1 has a front expanse surface 3 and a coated rear mating surface 4. The coatings on rear mating surface 4 are not shown; these are conventional coatings used in the preparation of electrochromic lenses and are not critical to the instant invention. Laminated to substrate 1 is substrate 2, which is the rear lens. Rear lens 2 has a coated front mating surface 5 and a rear expanse surface 6. The coatings on mating surface 5 are not shown; these are conventional coatings used in the preparation of electrochromic lenses and are not critical to the instant invention. Ion-conducting polymer layer 7 is disposed between substrates 1 and 2; this layer serves as both an ion-conducting electrolyte and a mechanical adhesive which bonds substrates 1 and 2. Shims 9 keep the thickness of ion-conducting polymer layer 7 uniform.

Figure 2:
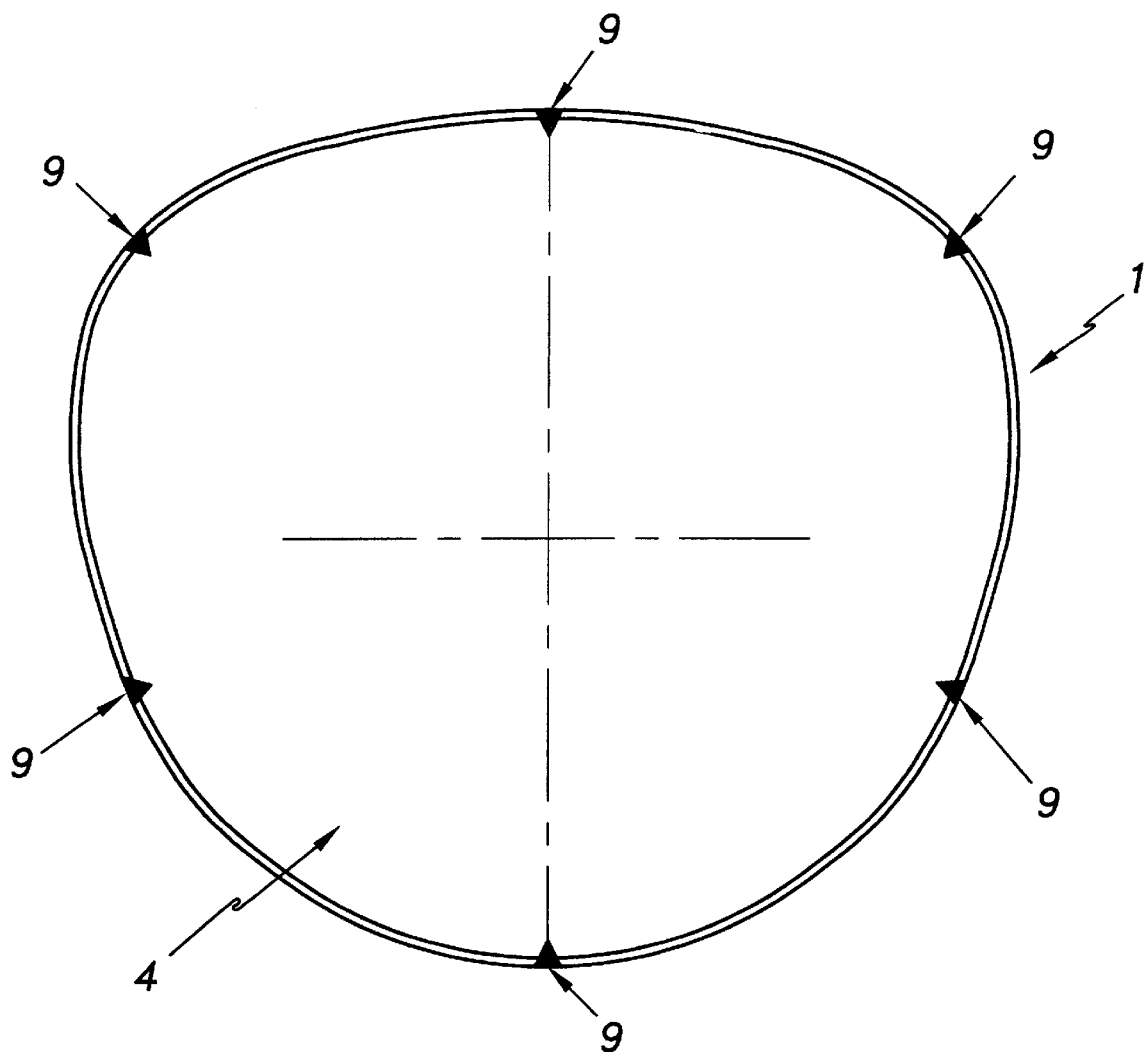
FIG. 2 is a top view of a first lens showing shim orientation.

As shown in FIG. 2, which is not drawn to scale, triangular shims 9 are oriented along the periphery of mating surface 4. Preferably, enough shims 9 are utilized to prevent 'rocking' of the lenses relative to each other with about 4 to about 10 shims being preferred. Shims 9 can be situated anywhere on surfaces 4 and/or 5, but are preferably positioned along the outer periphery of surface 4. In a preferred embodiment, shims 9 are affixed using a drop of ICP solution, with appropriate height adjustment. This prevents shims 9 from moving during lamination. Though shim shape is not believed to be critical, triangle-shaped or irregularly shaped shims are preferred. Such shapes enable the practitioner to easily orient each shim on a mating surface. Because of the size of shims typically used, e.g., about 2 to about 20 mils thick by about 2 to about 20 mils wide and about 2 to about 20 mils long for a square or rectangular shim, it would be easy to lay a shim having a square or rectangular shape on its side, which could result in rocking.

For this reason, irregularly shaped (e.g., triangular) shims of desired thickness are preferred.

EXAMPLES

The present invention is more particularly described in the following examples which are intended as illustrations only since numerous modifications and variations therein will be apparent to those skilled in the art.

Example 1

Preparation of Shims

A curable, non-solid adhesive composition comprising 27.5 weight percent 2-acylamido-2-methylpropanesulfonic acid (AMPSA), 46.5 weight percent N,N-dimethylacrylamide (DMA), 6.1 percent 1-methyl-2-pyrrolidone (NMP), 19.3 weight percent distilled water and 0.6 weight percent N,N-diethoxyacetophenone (DEOAP) initiator was prepared and a portion of this composition was cast into a clean TEFLON® polytetraflouroethylene mold shaped to provide a 50 cm by 75 cm rectangular polymer sheet about 0.25 mm thick. After curing using UV light, the resulting AMPSA/DMA polymer sheet was removed from the mold and cut into equilateral triangular shims having side dimensions of approximately 14 mils. Triangular shapes were prepared so that shims could be easily oriented on lens mating surfaces.

Example 2

Preparation of a Laminated Electrochromic Lens Containing Shims and an Ion-Conducting Polymer Layer A first lens containing thin films of $In_2O_3$:$SnO_2$ (indium tin oxide, or ITO) and iridium oxide and a second lens containing thin films of ITO and tungsten oxide were prepared in accordance with Example I of U.S. Pat. No. 5,618,390. After precharging the iridium oxide-coated lens per Example I of the '390 patent, shims prepared in accordance with Example 1 above were placed onto droplets of the non-solid adhesive of Example 1 positioned at the 12:00, 2:00, 4:00, 6:00, 8:00 and 10:00 positions on the mating surface of the tungsten oxide-coated lens. These droplets were then cured using UV light to secure the shims. A sufficient amount of the curable, non-solid adhesive composition of Example 1 to provide a 0.25 mm thick polymer interlayer was then placed between the $WO_3$ and iridium oxide half cells, and they were brought together via a conventional technique until both mating surfaces contacted the shims. The adhesive composition was then cured using UV light to form a uniform AMPSA/DMA polymer interlayer. The resulting laminated lens showed less than ⅛ diopter localized distortion and no secondary visual images in point source light. The center to edge thickness measured ±0.025 mm with an interlayer thickness of 0.25 mm.

Although the present invention has been described with reference to specific details of certain embodiments thereof, it is not intended that such details be regarded as a limitation upon the scope of the invention except as and to the extent that they are included in the accompanying claims.

What is claimed is:

1. A method for laminating first and second parts of an electrooptic device, said parts having first and second mating surfaces, respectively, which method comprises: a) placing a plurality of discrete shims between said first and second mating surfaces along the peripheral edges of said mating surfaces; b) placing an effective amount of a curable, non-solid adhesive composition between said first and second mating surfaces; c) bringing said first and second mating surfaces together until they contact said shims, thereby spreading said curable, non-solid adhesive composition between said parts; and d) curing said adhesive composition, thereby bonding said parts to each other.

2. The method of claim 1, wherein said first and second parts are optical lenses.

3. The method of claim 2, wherein said optical lenses are ophthalmic lenses.

4. The method of claim 1, wherein said curable, non-solid adhesive composition forms an ion-conducting polymer interlayer.

5. The method of claim 3, wherein said curable, non-solid adhesive composition forms an ion-conducting polymer interlayer.

6. The method of claim 1, wherein said shims are prepared from said curable, non-solid adhesive composition.

7. The method of claim 3, wherein said shims are prepared from said curable, non-solid adhesive composition.

8. The method of claim 1, wherein said shims are irregularly shaped.

9. The method of claim 3, wherein said shims are irregularly shaped.

10. The method of claim 1, wherein said first and second parts are complimentary electrochromic half cells and wherein said curable, non-solid adhesive composition forms an ion-conducting polymer interlayer between said first and second parts.

11. The method of claim 10, wherein said shims are prepared from said curable, non-solid adhesive composition.

12. The method of claim 10, wherein about 3 to about 12 shims are used.

13. A method for preparing a laminated electrooptic device comprising first and second substrates having first and second mating surfaces, respectively, and an adhesive interlayer of substantially uniform thickness, which method comprises: a) placing a plurality of discrete shims along the periphery of at least one of said mating surfaces; b) adding an effective amount of a non-solid adhesive composition to at least one of said mating surfaces; c) bringing said first and second mating surfaces together until said mating surfaces are uniformly spaced by said shims; and d) curing said adhesive, thereby bonding said substrates to each other.

14. The method of claim 13, wherein said non-solid adhesive composition forms an ion-conducting polymer interlayer.

15. The method of claim 13, wherein said shims are prepared from said non-solid adhesive composition.

16. The method of claim 13, wherein said shims are irregularly shaped.

17. The method of claim 16, wherein said shims are triangular.

18. The method of claim 13, wherein said shims are about 0.025 to about 0.625 mm thick.

19. The method of claim 13, wherein a suspension lamination technique is used.

* * * * *